US011885345B2

(12) United States Patent
Koning et al.

(10) Patent No.: US 11,885,345 B2
(45) Date of Patent: Jan. 30, 2024

(54) PUMP

(71) Applicant: IHC Holland IE B.V., Sliedrecht (NL)

(72) Inventors: Theodorus Adrianus Koning, Kinderdijk (NL); Erwin Cornelis Johannes Bijvoet, Kinderdijk (NL)

(73) Assignee: IHC Holland IE B.V., Sliedrecht (NL)

( * ) Notice: Subject to any disclaimer, the term of this patent is extended or adjusted under 35 U.S.C. 154(b) by 53 days.

(21) Appl. No.: 17/598,924

(22) PCT Filed: Apr. 1, 2020

(86) PCT No.: PCT/NL2020/050222
§ 371 (c)(1),
(2) Date: Sep. 28, 2021

(87) PCT Pub. No.: WO2020/204712
PCT Pub. Date: Oct. 8, 2020

(65) Prior Publication Data

US 2022/0178380 A1 Jun. 9, 2022

(30) Foreign Application Priority Data

Apr. 5, 2019 (NL) ...................................... 2022881

(51) Int. Cl.
*F04D 29/02* (2006.01)
*F04D 29/42* (2006.01)

(52) U.S. Cl.
CPC ....... *F04D 29/026* (2013.01); *F04D 29/4286* (2013.01); *F05D 2300/20* (2013.01); *F05D 2300/518* (2013.01)

(58) Field of Classification Search
CPC ............... F04D 29/026; F04D 29/4286; F05D 2300/20; F05D 2300/518
See application file for complete search history.

(56) References Cited

U.S. PATENT DOCUMENTS

| | | | | |
|---|---|---|---|---|
| 2,382,839 A | | 8/1945 | Wuensch | |
| 3,128,713 A | * | 4/1964 | Nechine | F04D 29/061 415/111 |
| 3,938,908 A | | 2/1976 | De Bree | |
| 4,383,800 A | * | 5/1983 | Becker | F04D 29/426 415/206 |
| 5,332,359 A | * | 7/1994 | Palgon | F04D 29/448 415/182.1 |
| 5,601,406 A | * | 2/1997 | Chan | F04D 29/4206 415/206 |
| 6,036,434 A | * | 3/2000 | Ray | F04D 29/2266 261/DIG. 71 |

(Continued)

FOREIGN PATENT DOCUMENTS

| | | |
|---|---|---|
| EP | 1 855 012 A1 | 11/2007 |
| EP | 1 906 029 B1 | 12/2009 |
| WO | 2013/112045 A1 | 8/2013 |

*Primary Examiner* — Dominick L Plakkoottam
(74) *Attorney, Agent, or Firm* — N.V. Nederlandsch Octrooibureau

(57) ABSTRACT

A pump housing comprises a circumferential wall forming an outer wall of the pump housing; a pump casing which connects to the circumferential wall on a first outer side to form a first chamber, the pump casing comprising a central opening to form an axial supply of the pump housing for material to be pumped; and pressurizing means to pressurize the first chamber.

11 Claims, 4 Drawing Sheets

(56) References Cited

U.S. PATENT DOCUMENTS

2013/0336774 A1* 12/2013 van den Berg ......... F04D 29/22
415/206
2014/0348645 A1* 11/2014 Koning ..................... F04D 7/04
415/204

* cited by examiner

PUMP

Centrifugal pumps can be used for pumping slurry comprising water and dredged materials during dredging operations. When such pumps are used for dredging, the pumps may be subjected to extreme wear and high pressures. Therefore wear resistant materials are often used. These wear resistant materials are typically brittle materials, for example, white cast iron such as MAXIDUR®.

Additionally, as a result of the pumping, high pressure will be generated forcing the pump casing outwardly. High loads may introduce a bending moment in the circumferential wall of the pump housing. To prevent introducing a bending moment, or keeping the bending moment relatively small, in the circumferential wall of the pump housing, some embodiments position the connection means which connect the pump casing and the circumferential wall at an outwardly position, where the circumferential wall is relatively thick. Thus, the connection means is able to take up high loads. An example of this is the LSA-S Series Slurry Pumps of GIW Industries. Another method for dealing with this pressure is to position a plurality of connection means in groups along the circumference of the pump housing, as shown in WO2013/0112045. This will result in lower stresses in the circumferential wall of the pump housing and reduces the chance of deformation of the circumferential wall.

SUMMARY

A pump housing comprises a circumferential wall forming an outer wall of the pump housing; a pump casing which connects to the circumferential wall on a location adjacent to a first outer side to form a first chamber, the pump casing comprising a central opening to form an axial supply of the pump housing for material to be pumped; and pressurizing means to pressurize the first chamber.

This provides a reduce pressure different between the interior of a slurry pump, the first chamber and outside the pump casing, which will result in a high reduction of the stresses in the pump casing that are cause by great pressure differential. Consequently this results in a reduction or elimination of malfunction or eventual breakage of said pump housing due to the stresses.

In an embodiment of the invention, the pump housing further comprises a shaft cover which connects to the pump housing on a second outer side to form a second chamber, wherein the pressurizing means to pressurize the second chamber. The first chamber and/or the second chamber can be a closed chamber.

The first and second chambers and pressurizing means allow for a pressurized fluid to fill the first and/or second chambers. If the pressurized fluid is at a pressure between the pump pressure and the outer pressure, stresses from the circumferential wall can be removed and the pressure can still be contained by the pump casing and shaft cover. This is of special importance since the pressure formed inside the pump casing, while in operation, can be extremely high. This high pressure inside the housing can produce heavy wear, particularly on the rounded parts of the interior of the housing. The present invention helps to reduce or eliminate this wear and tear on the interior or the pump housing, and especially on the more vulnerable parts.

In an embodiment of the invention, the chamber comprises a predefined volume. Moreover, the predefined volume of the chamber is constant along its entire length.

Furthermore, the predefined volume is defined by a first section and a second section to allow a pressurized fluid therein.

According to an embodiment of the invention, the first and second sections are connected such that the pressure along the volume is equally distributed. The predefined volume of the first section is different than the predefined volume of the second section. This configuration allows for a circumferential wall of the pump housing with a reduced wall thickness when compared to standard pump housings. This will also minimize the production cost due to the lower amount of material needed to build the pump housing. Additional and/or alternative embodiments can include a plurality of reinforcing ribs positioned outward from the pump casing and radially with respect to the central opening; the ribs being integral with the pump casing; the pump casing and/or the shaft cover connecting to the circumferential wall with fastening means; the pressurizing means comprising one or more lines which can supply pressurized fluid to the first chamber and/or the second chamber; the one or more lines extending through the shaft cover and/or the pump casing; the fluid supplied being flushing fluid; the pump casing being a brittle material; the pressurizing means pressurizing the first chamber and/or the second chamber to a pressure between a pump pressure and a pressure outside of the pump; and/or the pressurizing means pressurizing the first chamber and/or the second chamber to about 80% of the pump pressure; and/or the circumferential wall being made of a first material and the pump casing and/or the shaft cover being made of a second material.

According to an embodiment a pump is formed comprising a pump housing according to any of the preceding options or embodiments.

A method of forming a pump housing with a circumferential wall, a pump casing and a shaft cover can include connecting the pump casing to the circumferential wall so that a first chamber is formed between and outer first side of the circumferential wall and the pump casing; connecting the shaft cover so that a second chamber is formed between an outer second side of the circumferential wall and the shaft cover; and pressurizing the first chamber and/or the second chamber.

Additional and/or alternative embodiments can include the step of pressurizing the first chamber and/or the second chamber comprising providing a pressurized fluid to the first chamber and/or the second chamber; the pressurized fluid being a flushing fluid; the pressurized fluid being provided through one or more lines going through the shaft cover and/or the pump casing; the step of pressurizing the chamber comprising pressurizing the chamber to a pressure about 80% of a pressure within the pump; and/or the pump casing and/or the shaft cover being made of a first material and the circumferential wall being made of a second material.

According to a further aspect there is provided a method of forming a pump housing with a circumferential wall, a pump casing and a shaft cover, the method comprising the steps of: a) connecting the pump casing to the circumferential wall so that a first chamber is formed between and outer first side of the circumferential wall and the pump casing; and b) pressurizing the first chamber. Advantageously, this results in prevention or at least in minimizing the stresses in pump parts and therefore, materials, particularly in the more sensitive parts of the pump housing such as rounded sections.

According to an embodiment of the present invention, before or after the step b), the method comprises the step of: c) connecting the shaft cover so that a second chamber is formed between an outer second side of the circumferential wall and the shaft cover; and pressurizing the second chamber.

According to an embodiment the steps of pressurizing the first chamber and/or the second chamber comprises providing a pressurized fluid to the first chamber and/or the second chamber.

According to an embodiment, the pressurized fluid is flushing fluid. Moreover, the pressurized fluid is provided through one or more lines going through the shaft cover and/or the pump casing.

According to an embodiment of the invention the method further comprises the step of pressurizing the chamber to a pressure about 80% of a pressure within the pump.

According to a further aspect of the invention the circumferential wall is made of a first material and the pump casing and/or the shaft cover is made of a second material.

DETAILED DESCRIPTION

Figure 1A:
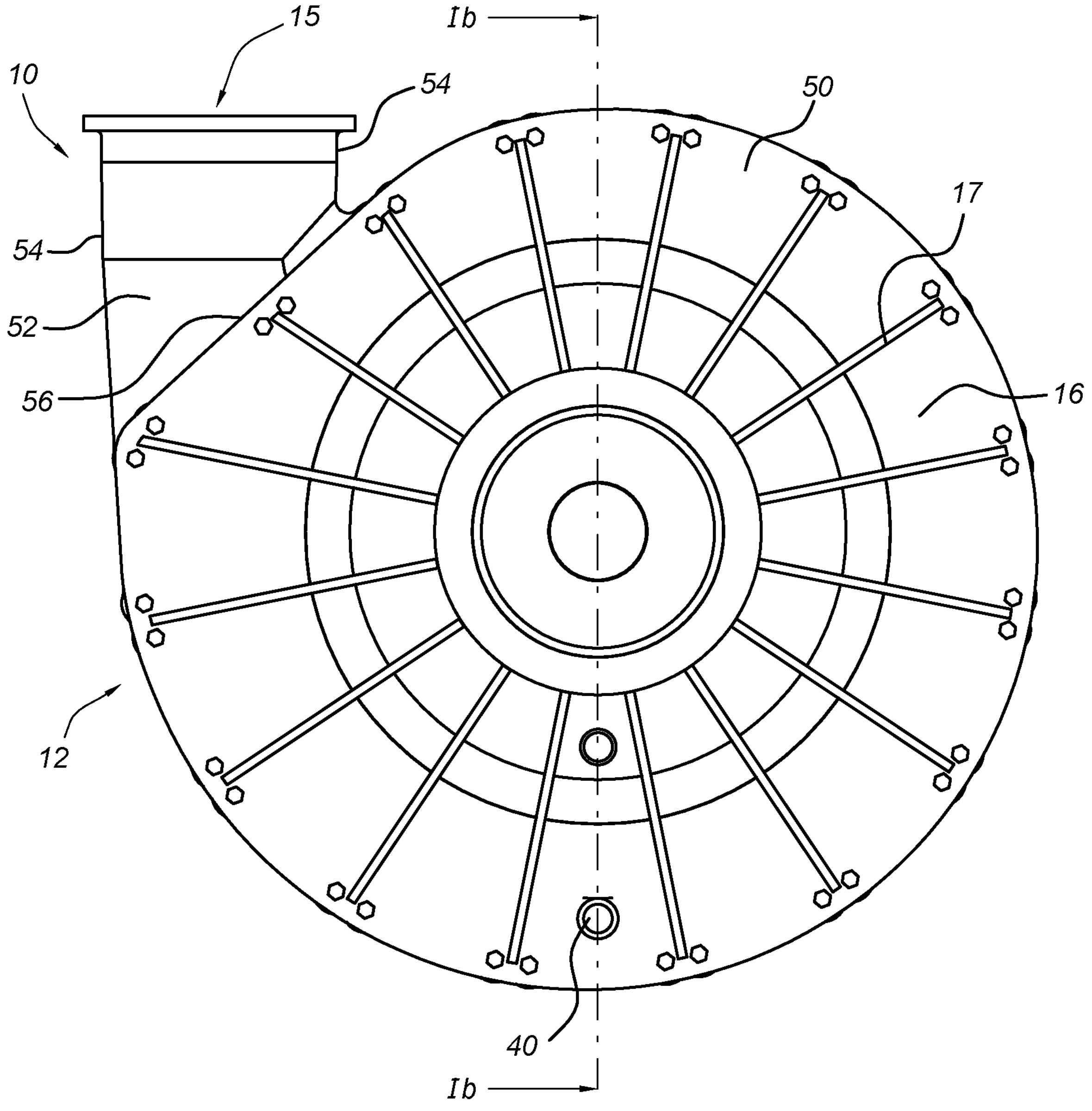
FIG. 1A shows a back side view of a centrifugal pump.
Figure 1B:
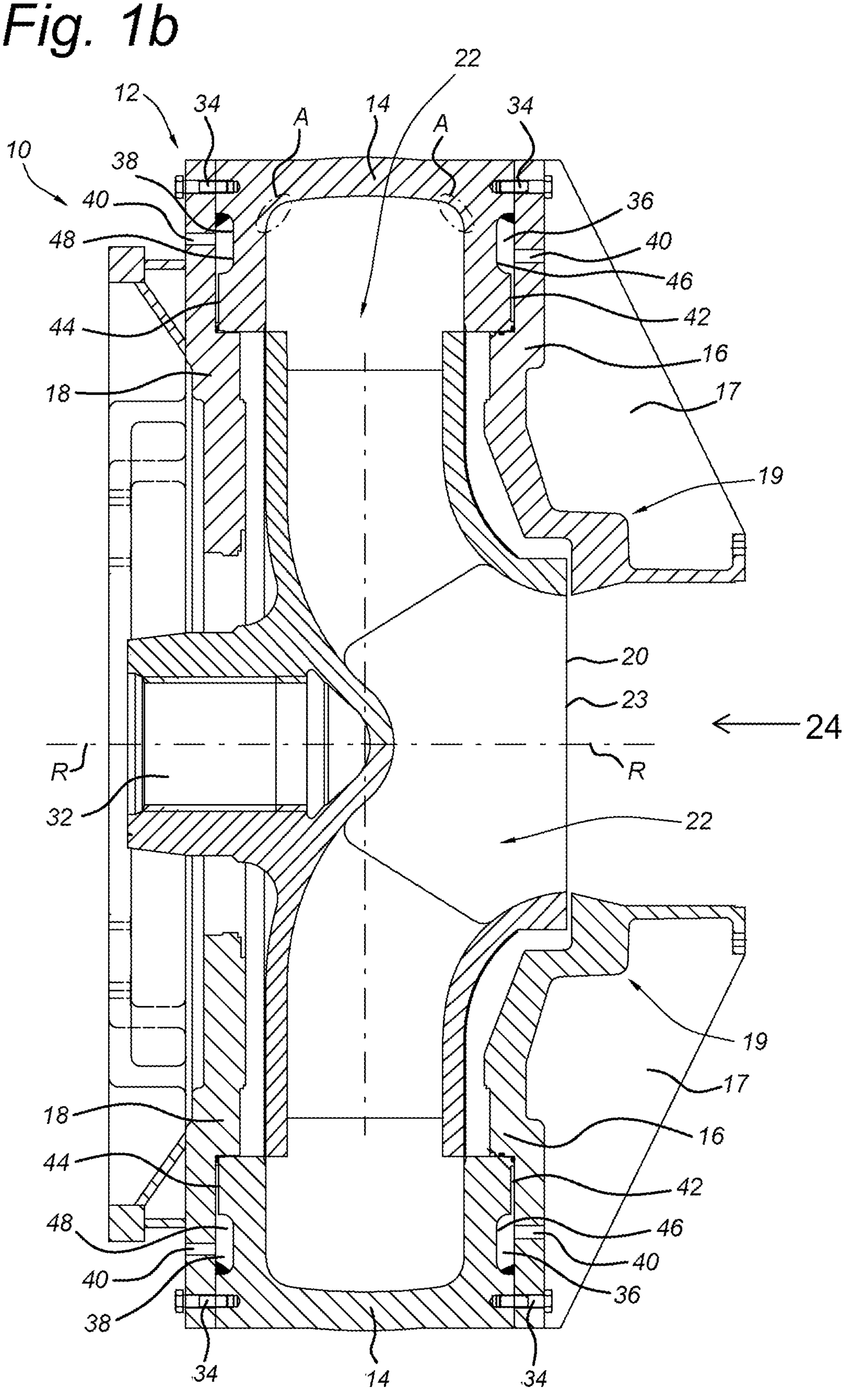
FIG. 1B shows a cross-sectional view of the pump of FIG. 1A along line 1B-1B.
Figure 1C:
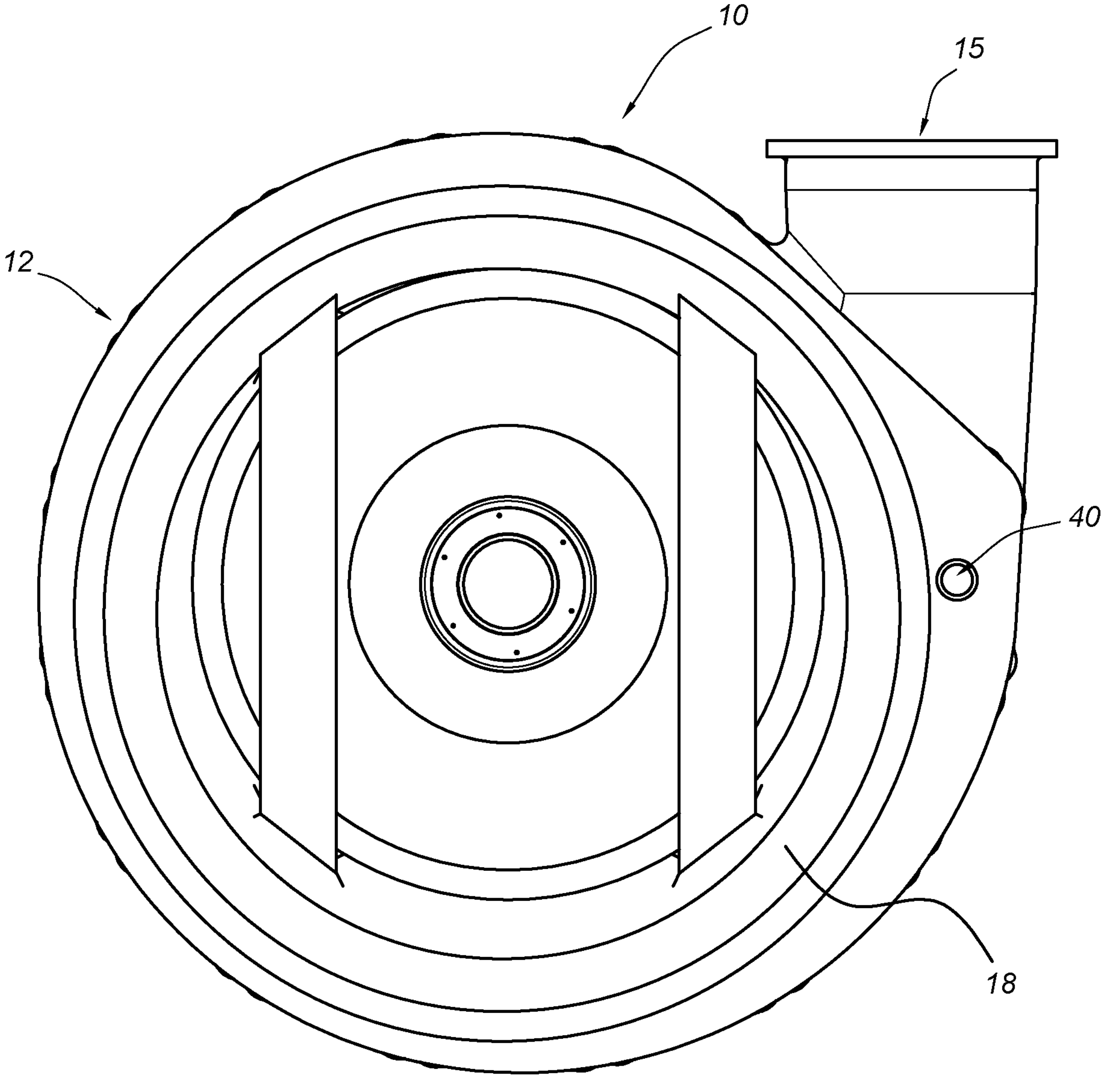
FIG. 1C shows a front side view of the pump of FIG. 1A.
Figure 1D:
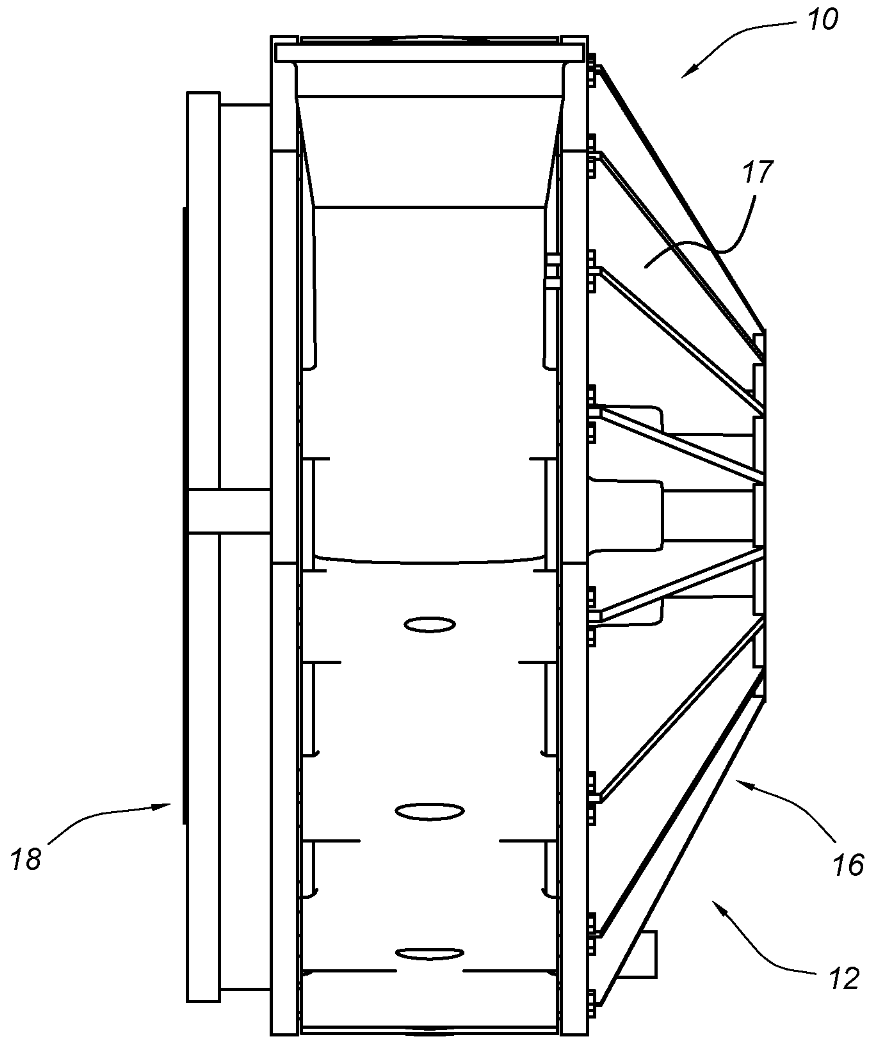
FIG. 1D shows a side view of the pump of FIG. 1A.

FIG. 1A shows a back side view of a centrifugal pump 10, FIG. 1B shows a cross-sectional view of pump 10 along lines B-B, FIG. 1C shows a front side view of pump 10, and FIG. 1D shows a side view of pump 10. Pump 10 may be used for pumping a slurry comprising a mixture of water and dredged materials, for example, sand and rocks.

Pump 10 includes pump housing 12 in the shape of a spiral casing. The pump housing 12 comprises a centrifugal section 50 and an outlet section 52, including an outlet 15. As can be appreciated in FIG. 1A, the centrifugal section 50 has a substantially circumferential shape around a rotational center R of the pump 10. The outlet section 52, which communicates with the outlet 15, has an uneven shape forming a soft corner with opposing walls 54, 56 having an angle of separation of about 90°-180°. Pump housing 12 includes a circumferential wall 14, with an outlet 15, a pump casing 16 with ribs 17, a shaft cover 18, an axial inlet 20, an impeller 22, a drive shaft 32, a connection means 34, a first chamber 36, a second chamber 38 and fluid lines 40. The circumferential wall 14 may have a u-shaped or semicircular cross-section with a first side 42 and a second side 44. In the embodiment shown, on an outer side of each of the first side and second sides 42, 44, comprise circumferential grooves 46, 48, which form a first pressure chamber 36 and a second pressure chamber 38. These chambers are formed when the pump casing 16 and shaft cover 18 are connected to circumferential wall 14 having a predefined volume. The circumferential wall 14 can be made of a first material, for example a brittle but strong material, which can be wear-resistant, such as a wear-resistant cast iron material. Pump casing 16 and/or shaft cover 18 can be made of a second material, for example, a more ductile material, which can also be wear-resistant.

The circumferential wall 14 comprises internal curved parts A, which are subjected to high stresses due to the turbulence flow of the slurry, when in operation. By having the small radius of the internal curved parts A, the turbulence flow can be very high, but due to the first pressure chamber 36 and/or the second pressure chamber 38, the casing and circumferential wall stresses are significantly reduced.

The skilled person will appreciate that fluid can be inserted into the chambers 36, 38 by pressurizing means (e.g. a conduit, hose, etc.) that are securely connected to or part of the fluid lines 40. The pressurizing means comprise suitable material to allow the pressurized fluid to flow through it without having any deformation problems. The fluid can be any suitable fluid, such as water.

As can be appreciated in FIG. 1*b*, the first and second pressure chambers 36, 38 may comprise a sealing part to ensure clean chambers, while preventing flow or pressure losses in those chambers 36, 38. Moreover, this enables a relatively high pressure in chambers, and the ability to control the pressure applied to the pump 10 and particularly into the pump housing 12.

Pump casing 16 is connected to first side 42 of circumferential wall 14 through fastening means 34. Line 40 connects through pump casing 16 to first pressure chamber 36. Ribs 17 connect to pump casing 16 and can be formed integrally with pump casing or can be formed separately and connected to pump casing 16. Shaft cover 18 is connected to second side 44 of circumferential wall 14 through fastening means 34. Line 40 connects through shaft cover 18 to second pressure chamber 38. The connections between shaft cover 18 and circumferential wall 14 and/or between pump casing 16 and circumferential wall 14 can include seals, for example o-ring seals. While fastening means 34 are shown as bolts, in other embodiments, they can be other fastening means, for example, clamping means.

The pressure chambers 36, 38 are filled with pressurized fluid through fluid lines 40. This pressurized fluid can be provided, for example, from flushing water for pump 10. The fluid in pressurized chambers 36, 38 can be adjusted to a pressure between the pressure inside pump 10 and the pressure outside of pump 10, for example 80% of the pressure inside pump 10. As the flushing water pressure substantially corresponds to the pump pressure, the flushing water can be reduced in pressure before it flows to pressure chambers 36, 38. This can be done, for example, by a pressure reducing module, such as the one shown in WO2012/002812, which is hereby incorporated by reference.

Pump casing 16 and shaft cover 18 provide strength to pump housing 12. Pump casing 16 has a central opening 24 which may form axial supply 23 or may surround axial supply 23. As shown in this embodiment, pump casing 16 may comprise a stepped up part 19 and reinforcing ribs 17. The pump casing 16 may also be referred to as the suction cover or suction lid.

Shaft cover 18 (or shaft lid) is connected to circumferential wall 14 opposite pump casing 16 and has a central opening to allow drive axis 32 of a pump motor to be connected to impeller 22.

During operation, drive axis 32 and impeller 22 rotate about rotation axis R. By action of impeller 22, the mass to be pumped is forced radially outward into pump housing 12 by centrifugal forces. The mass is then entrained in the circumferential direction of pump housing 12 toward the tangential outlet spout 15 of pump housing 12. The pumped mass which, after leaving impeller 22, is entrained in the circumferential direction of pump housing 12 flows largely out of the tangential outlet 15 of pump housing 12. A small amount of the entrained mass re-circulates, i.e., flows along the junction between the inner surface of tangential outlet 15 and the inner surface of the circumferential wall 14 (known as the cutwater) and back into the pump housing 12.

When pumps such as pump 10 are used for dredging, they are subjected to extreme wear due to the rough content of the dredge, especially impeller 22 and circumferential wall 14. Thus, wear-resistant material is typically used in forming these parts. These wear-resistant materials are typically very brittle, for example, white cast iron such as MAXIDUIR®. The stresses can cause the brittle material to break due to the pressure difference inside and outside pump 10. To protect against this in past systems, a full outer housing was added to the pump, as shown in EP1906029B1. However, this required a lot of extra material in order to construct a full outer housing and resulted in a very heavy pump.

Pump 10 protects against this by forming pump casing 16 and shaft cover 18 of a more ductile material, forming circumferential wall 14 from a wear-resistant but brittle material, and forming pressure chambers 36, 38 between circumferential wall 14 and pump casing 16 and between circumferential wall 14 and shaft cover 18, respectively. The pressure chambers are filled with fluid coming from lines 40 that is a pressure between the pressure inside the pump and the pressure outside the pump. This pressure can be, for example, 80% of the pressure inside the pump. Thus, the pressurized chambers 36, 38 can reduce the pressure difference over the more brittle circumferential wall 14, and the softer but stronger pump casing 16 and shaft cover 18 can contain the pressure.

As the pump casing 16 and shaft cover 18 are not subjected to wear from the mass in pump 10, a brittle material is not necessary and they can be made of more ductile material to contain the pressure in pressure chambers 36, 38. By applying a pressure between the pressure inside pump 10 and outside pump 10 in first and second pressurized chambers 36, 38, the stress in the circumferential wall 14 is reduced significantly, particularly in regions A, making the use of a brittle material for circumferential wall 14 sufficient and reducing the possibility of fracturing the brittle material due to pressure differences. Thus, in pump 10, the pressure chambers 36, 38 provide for the removal of stresses from the brittle circumferential wall 14, and stresses are now contained by the strong pump casing 16 and shaft cover 18 which are not subject to wear and can therefore be made of a more ductile material. This results in an increased robustness of pump 10 to pressure surges and can result in a longer wearing life of circumferential wall 14 and the overall pump 10.

While first pressure chamber 36 and second pressure chamber 38 are shown to be formed by a circumferential grooves 46, 48 in the outer walls 42, 44 of circumferential wall 14, pressure chambers 36, 38 can be formed in other ways between circumferential wall 14 and pump casing 16 and shaft cover 18. For example, pump casing 16 and/or shaft cover 18 could include a circumferential groove or each part could include a groove which fit together to form pressure chambers 36, 38.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

REFERENCE NUMERALS

10—Pump
12.—Pump housing
14.—Circumferential wall
15.—Outlet
16.—Pump casing
17.—Ribs
18.—Shaft cover
20.—Axial inlet
22.—Impeller
32.—Drive shaft
34.—Connection means
36.—First chamber/First pressure chamber
38.—Second chamber/Second pressure chamber
40.—Fluid line
42.—First side of the circumferential wall
44.—Second side of the circumferential wall
46.—Circumferential groove
48.—Circumferential groove
50.—Centrifugal section
52.—Outlet section
54.—Opposing wall
56.—Opposing wall

The invention claimed is:

1. A pump housing comprising:

a circumferential wall forming an outer wall of the pump housing, the circumferential wall having a u-shaped or semicircular cross-section with a first side and a second side connected by an annular wall;

a pump casing which connects to the circumferential wall only on an outer side of the first side to form a first chamber, the pump casing comprising a central opening to form an axial supply of the pump housing for material to be pumped;

a shaft cover which connects to the circumferential wall only on an outer side of the second side to form a second chamber; and pressurizing means to provide a pressurized fluid to the first chamber and/or the second chamber through one or more lines going through the shaft cover and/or the pump casing, wherein the outer sides of each of the first side and second sides comprise circumferential grooves, which form the first pressure chamber and the second pressure chamber, and wherein the first pressure chamber and second pressure chamber are formed when the pump casing and shaft cover are connected to the first and second sides of the circumferential wall, respectively, leaving the annular wall of the circumferential wall not covered by the pump casing or the shaft cover.

2. The pump housing of claim 1, wherein each of the first chamber and the second chamber comprises a predefined volume.

3. The pump housing of claim of claim 1, further comprising a plurality of reinforcing ribs positioned outward from the pump casing and radially with respect to the central opening.

4. The pump housing of claim 3, wherein the ribs are integral with the pump casing.

5. The pump housing of claim 1, wherein the pump casing and/or the shaft cover are connected to the circumferential wall with fastening means.

6. The pump housing of claim 1, wherein the fluid supplied is flushing liquid.

7. The pump housing of claim 1, wherein the pump casing is a brittle material.

8. The pump housing of claim 1, wherein the pressurizing means pressurizes the first chamber and/or the second chamber to a pressure between a pump pressure and a pressure outside of the pump.

9. The pump housing of claim 8, wherein the pressurizing means pressurizes the first chamber and/or the second chamber to about 80% of the pump pressure.

10. The pump housing of claim 1, wherein the circumferential wall is made of a first material and the pump casing and/or the shaft cover is made of a second material.

11. A method of forming a pump housing with a circumferential wall, a pump casing and a shaft cover, wherein the circumferential wall has a u-shaped or semicircular cross-section with a first side and a second side connected by an annular wall, the method comprising the steps of:

a) connecting the pump casing to an outer side of the first side so that a first chamber is formed between the outer side of the first side of the circumferential wall and the pump casing;

b) connecting the shaft cover to an outer side of the second side so that a second chamber is formed between the outer side of the second side of the circumferential wall and the shaft cover; and b) pressurizing the first chamber and/or the second chamber with pressurized fluid through one or more lines going through the shaft cover and/or the pump casing, wherein the annular wall is not covered by the pump casing or the shaft cover.

* * * * *